United States Patent
Robison et al.

(10) Patent No.: US 6,491,126 B1
(45) Date of Patent: Dec. 10, 2002

(54) STRADDLE-TYPE ALL TERRAIN VEHICLE WITH PROGRESSIVE DIFFERENTIAL

(75) Inventors: Gary Robison, Fletcher, NC (US); Claude Gagnon, Magog (CA); Vincent Morin, Canton de Brompton (CA)

(73) Assignee: Bombardier Inc., Montreal (CA)

( * ) Notice: Subject to any disclaimer, the term of this patent is extended or adjusted under 35 U.S.C. 154(b) by 0 days.

(21) Appl. No.: 09/339,517

(22) Filed: Jun. 24, 1999

(51) Int. Cl.⁷ ............................................. B60K 17/344
(52) U.S. Cl. ......................................... 180/233; 475/88
(58) Field of Search ................................ 180/233, 248, 180/247, 249, 231, 86, 245; 74/665 T; 475/88, 150

(56) References Cited

U.S. PATENT DOCUMENTS

| | | | | |
|---|---|---|---|---|
| 5,102,378 A | * | 4/1992 | Gobert | 475/231 |
| 5,515,940 A | * | 5/1996 | Shichinohe et al. | 180/376 |
| 5,520,589 A | * | 5/1996 | Dewald et al. | 475/231 |
| 5,582,557 A | * | 12/1996 | Dissett et al. | 475/231 |
| 5,632,185 A | | 5/1997 | Gassmann | 74/650 |
| 5,690,201 A | * | 11/1997 | Gassman | 192/35 |
| 5,865,701 A | * | 2/1999 | Sowa et al. | 475/86 |
| 5,881,849 A | | 3/1999 | Gassmann | 188/294 |
| 5,916,052 A | * | 6/1999 | Dick | 475/198 |
| 5,938,555 A | * | 8/1999 | Leeper | 475/88 |
| 6,001,040 A | * | 12/1999 | Engle | 475/55 |
| 6,041,903 A | * | 3/2000 | Burns et al. | 192/85 AA |
| 6,056,658 A | * | 5/2000 | Illmeier | 475/88 |

OTHER PUBLICATIONS

Theodor Gassmann, VISCO–LOK: A Speed–Sensing Limited–Slip Device with High–Torque Progressive Engagement, Feb. 26–29, 1996, SAE Technical Paper Series #960718, pp.*

* cited by examiner

*Primary Examiner*—Avraham Lerner
*Assistant Examiner*—Tony Winner
(74) *Attorney, Agent, or Firm*—Pillsbury Winthrop LLP

(57) ABSTRACT

A four-wheel drive straddle-type all-terrain vehicle has a progressive limited-slip differential that functions as an open differential when the wheel speed differential is less than a predetermined threshold, or cutting point, and functions as a progressive limited-slip differential when the wheel speed differential exceeds the cutting point. The progressive limited-slip differential is able to transfer torque to the wheel with greater traction as a generally linear function of the wheel speed differential, meaning that the more one wheel slips with respect to the other, the more torque is transferred from the slipping wheel to the wheel with traction. The progressive limited-slip differential comprises a rotary shear pump that drives a piston against a pack of clutch plates. The force of the piston against the clutch pack locks the left and right axles together to provide optimal traction in slippery conditions. Since the rotation of the pump is caused by relative wheel spin, the progressive limited-slip differential is said to be speed-sensitive in that it is responsive to wheel speed differential and exerts a locking force directly proportional to speed differential.

26 Claims, 8 Drawing Sheets

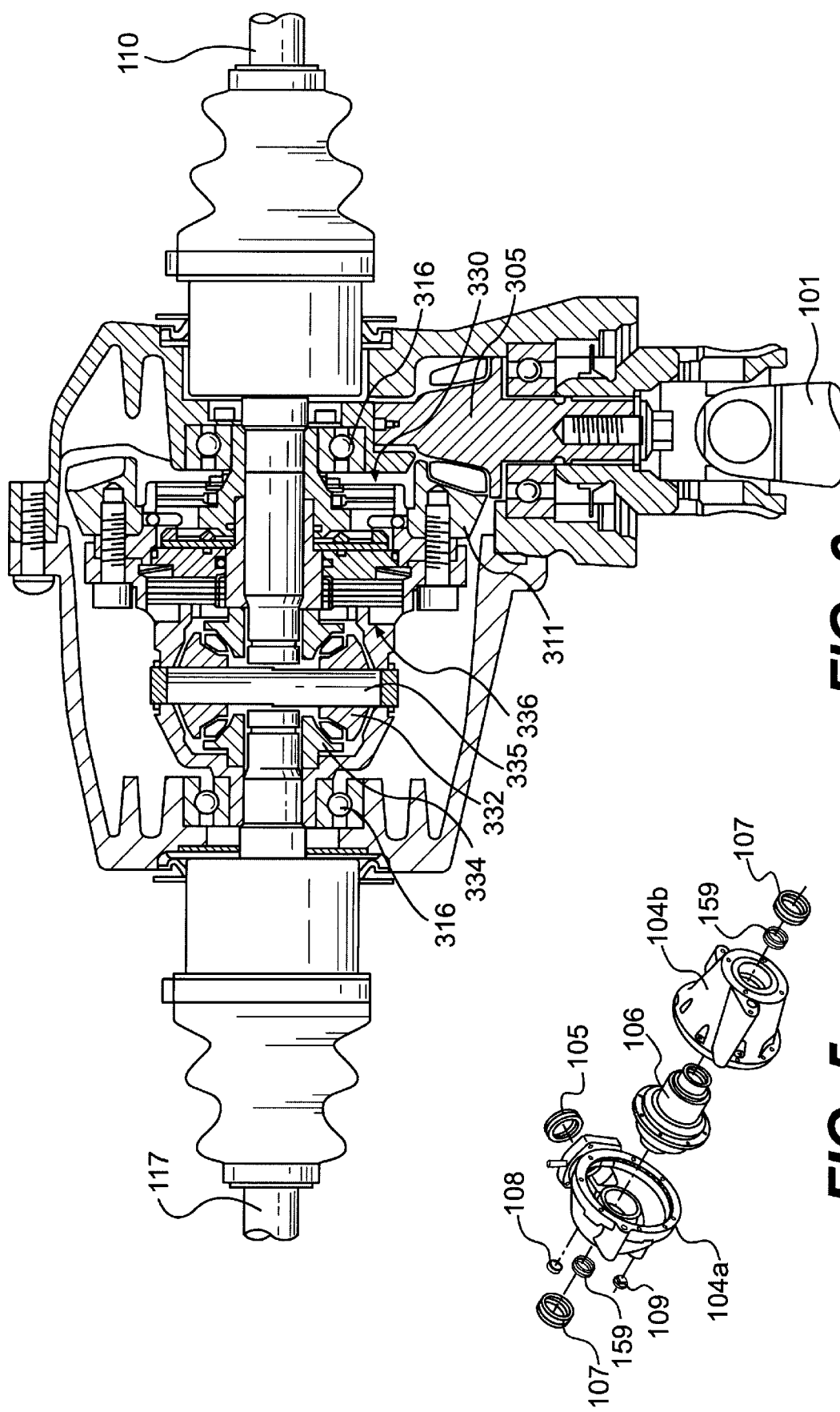

STRADDLE-TYPE ALL TERRAIN VEHICLE WITH PROGRESSIVE DIFFERENTIAL

FIELD OF THE INVENTION

The present invention relates to a straddle-type all-terrain vehicle and, more particularly, to a straddle-type all-terrain vehicle with a limited-slip differential.

BACKGROUND OF THE INVENTION

In recent years, there has been a growing demand for four-wheel drive straddle-type all-terrain vehicles as opposed to the simpler two-wheel drive variety. This has been largely due to the desire to drive these vehicles in increasingly rough off-road conditions, which require improved traction and improved capability to transmit engine torque to the wheels.

Presently on the market are two types of four-wheel drive straddle-type all-terrain vehicles (ATV's). The first type employs a regressive limited-slip differential at the front and a fully locked axle at the rear. The front differential is either of the speed-sensing or torque-sensing variety. Examples of regressive differentials are the Sure-Trac™ and the Detroit Locker™. These types of differentials will be discussed in greater detail later. The second type of drive train found on the market today uses an over-running clutch in the front and a fully locked axle at the rear.

The regressive limited-slip differential permits engine torque to be transferred equally to the front drive axles provided that the tires have equal traction. A regressive limited-slip differential transfers torque from the slipping wheel to the wheel with traction as a function of the differential wheel speed. However, the transfer of torque diminishes as the wheel speed differential increases, eventually reaching a plateau beyond which no more torque can be transferred (hence the name "regressive").

The over-running clutch functions according to the difference in wheel speed between the front and rear wheels. When the front and rear axles are turning at the same speed, the vehicle is powering only the rear wheels (2x4 mode). However, if the difference in axle speed increases beyond a threshold value, the over-running clutch couples the front drive axle to the rear drive axle (4x4 mode). Since the vehicle runs mainly in 2x4 mode, steering is easy. However, when wheel slippage occurs and power is transferred also to the front wheels (4x4 mode), vehicle performance becomes less than optimal.

Most current 4x4 ATV's are equipped with a solid rear drive axle. This provides optimal traction because torque is delivered to both rear drive wheels all the time irrespective of the ground conditions. Due to the short wheelbase, it is not necessary to employ a rear differential because the rear inner wheel tends to lift during cornering, allowing natural, non-detrimental wheel slippage. However, when hauling heavy loads on the rear of the ATV, the downward load precludes the natural wheel lift during cornering, thus making it necessary to employ an open differential at the rear or else suffer the consequences of inner rear tire drag. Some ATV's have a manually selectable locking rear axle that allows the user to select either an open rear differential or a closed, locked axle depending on the traction requirements.

In order to fully appreciate the present invention, it is preferable to understand the structure and functioning of a differential.

When cornering, the outer wheels of an straddle-type all-terrain vehicle travel a greater distance (and thus rotate at a greater angular velocity) than the inner wheels. For a non-driven axle, the left and right wheels are free to rotate independently of each other and thus each wheel follows at its own angular velocity. However, for wheels that are coupled to a driven axle, it is necessary to employ a differential (or "diff") to allow the outer wheel to turn faster than the inner wheel while still transmitting torque to both wheels.

In the absence of a differential, the inner wheel during cornering will drag because most of the weight is on the outer wheel and thus the inner wheel is forced to rotate at the same angular velocity as the outer wheel even though the inner wheel has a shorter distance to travel. The partial dragging of the inner wheel is detrimental to tire wear, comfort and control and furthermore promotes understeer (the tendency of the vehicle to continue in a straight line). Hence the necessity for a differential capable of permitting the inner wheel to rotate at a lesser angular velocity than the outer wheel during cornering while still distributing torque to both the inner and outer wheel.

Engine torque is transmitted through the clutch and transmission gears to a drive pinion mounted at the end of the drive shaft. This drive pinion is typically a bevel gear (either straight or spiral) meshed with a perpendicular (also beveled) ring gear. A differential case (or housing) is fixed to the ring gear so that the case revolves with the ring gear about an axis defined by the drive axle. Inside the differential case is typically a pinion shaft mounted to the differential case and rotatable therewith in the plane perpendicular to the axis defined by the drive axle. Mounted on the pinion shaft are two differential beveled pinion gears which revolve with the ring gear and case but which are also free to rotate about the pinion shaft axis. The differential pinion gears are meshed with a pair of beveled side gears which are each splined to a drive axle. This arrangement is termed an "open differential". These devices are also colloquially known as "force balancers" since they distribute an equal amount of torque to each drive axle irrespective of the rotational speed of each axle. In operation, the rotation of the drive pinion causes the ring gear and the differential case to revolve about the axis defined by the drive axles. Since the differential pinion gears are mounted to the pinion shaft, they revolve in a planetary fashion around the aforementioned axis and, in so doing, drive the meshed side gears (thereby driving each of the drive axles).

When traveling in a straight line (and not exceeding the traction limit of the tires), the differential pinions and side gears move with the case. There is no relative movement between the teeth of the differential pinions and those of the side gears.

When cornering, the differential pinions still revolve with the ring gear and differential case. Since the outer wheel must now rotate faster than the inner wheel, the differential pinions must now also rotate about their shaft axis. The rotation of the differential pinions compensates for the differential rotation of the outer and inner axles. Nevertheless, the rotation of the differential pinions does not affect the transfer of torque to each of the side gears. Thus, the differential pinions continue to exert a torque on each of the side gears, which in turn, transmit torque to the drive wheels.

An open differential can compensate for any variation in axle speed up to the traction limit of the wheels. In other words, when one wheel begins to slip or spin, the differential case continues to revolve (assuming the torque being transmitted from the drive pinion to the ring gear remains constant, i.e., assuming constant engine torque). As the differential case revolves, the differential pinions continue to revolve around the side gears. However, since the side gear coupled to the free-spinning wheel presents a much smaller rotational inertia, the differential pinions will transfer all of the available torque to the side gear coupled to the free-spinning wheel. Thus, no torque is transferred to the wheel with the greater traction resulting in a complete loss of traction. In the industry jargon, it is said that the differential pinions "walk" around the axle connected to the wheel with the greater traction. In other words, the differential pinions "take the path of least resistance" by driving the side gear splined to the free-spinning wheel instead of driving the wheel with traction.

Thus, although the open differential distributes torque equally to both wheels when cornering, the open differential is susceptible to wheelspin (and thus loss of traction and control) whenever the propulsive force generated by the wheel (the dot product of wheel torque and tire radius) exceeds the traction limit.

To overcome the shortcomings associated with open differentials, limited-slip differentials were introduced which, as their name implies, limits slippage of the tire with lesser traction and transfers torque to the tire with greater traction all the while permitting the drive axles to rotate at different angular velocities. It should be noted that the generic moniker "limited-slip differential" is often loosely applied to a family of such devices that perform the above function of limiting slippage and transferring torque to the wheel with greater traction. Strictly speaking, there are four classes of limited-slip differentials: (1) pure limited-slip differentials which limits wheelspin and transfers torque to the wheel with greater traction; (2) self-locking differentials which lock the drive axles together during acceleration; (3) torquesensing differentials which allocate the available torque according to the traction available; and (4) viscous-coupling differentials which use viscous shearing to limit wheel speed differences. It should be noted that some vehicles employ "traction control" which is not a differential but a control system that actuates the brakes whenever detectors sense the onset of wheelspin. The traction control unit is often coupled with a spark-interrupter or fuel cut-off prevent the brakes from becoming overloaded during operation of the traction control unit.

Among the pure limited-slip differentials are the cam and pawl differential, the clutch pack differential and the active clutch pack differential. While each type varies slightly in structure, all limited-slip differentials utilize some sort of friction couplings to provide resistance to normal differential action. The friction coupling can be clutch plates, clutch cones, governors, or clutch packs. In broad terms, the limited-slip differential functions as follows: when traveling in a straight line, the friction coupling locks the drive axles to the differential case so that torque is delivered to both axles. When cornering, the differential action (i.e. the rotation of the differential gears) releases the friction coupling on the outer axle allowing the outer wheel to rotate more freely than the inner wheel. Consequently, more torque is transferred to the inner axle and wheel.

The oldest limited-slip is the cam and pawl differential, first used by Ferdinand Porsche in 1934. This differential uses an inner cam splined to one drive axle and an outer cam splined to the other drive axle. The cams are mounted concentrically so as to sandwich a plurality of equally spaced pawls (or "chicklets") within a cage-like structure which is integral and rotatable with the differential case and ring gear. In straight-line driving, the cage rotation causes both the inner and outer cams to rotate simultaneously because the pawls become wedged between the inner and outer cams. During cornering, the pawls slip between the cams and thereby allow the differential to function as an open diff. The main shortcoming of the cam and pawl diff is that component wear is substantial and that, once the parts become worn, the locking ability is greatly hindered.

The clutch pack differential is similar to the open diff in construction in that it typically comprises a pair of beveled differential pinions meshed with a pair of beveled side gears. The differential pinions are rotatably mounted about a pinion shaft that is fixed to the differential case thereby allowing the differential pinions to both rotate about the shaft axis and revolve about the axis of the drive shaft (with the case and ring gear). In the clutch pack diff, there are two packs of clutch plates located on either side of the side gears. Each clutch pack has clutch plates alternately mounted to the differential case or to the drive axles so that, when the clutch plates are forced together, the friction therebetween causes the case to become frictionally locked to the drive axles. Thus, when the differential case is driven by the drive pinion, both drive axles are forced to turn since they are frictionally coupled to the case (during straight-line driving). As the torque on the case increases, the spreading force increases and thus the loads pushing the clutch plates together increases. It is this frictional coupling of the clutch plates that limits wheel spin or slippage.

The engagement of the clutch plates is achieved by redirecting the torque exerted on the pinion shaft in a perpendicular (axial) direction. The pinion shaft is mounted at each end between a split thrust member (having angled ramps) which responds to the torque on the pinion shaft by spreading apart and thereby exerting an outward force on the clutch plates. In other words, the angled ramps convert the tangential force (i.e. the quotient of the pinion shaft torque divided by its lever arm) into an axial force proportional to the angle of the ramps. The angle of the ramps can be varied to achieve different performance characteristics. The angle of the ramps on the thrust side (or drive side, i.e. the side against which the pinion shaft exerts its load during forward acceleration) normally has a different angle from that of the coast side (the side against which the pinion shaft presses during engine braking). For the thrust side, a 30-degree ramp angle transmits maximal loads to the clutch plates whereas a 90-degree ramp transmits the least. A typical ramps angle of 45 degrees on the thrust side produces favorable lockup. To produce a minimal locking force during braking, the coast side ramps typically have an angle of 80 or 85 degrees. In addition to the ramp angles, the driving torque, the preload, the stacking of the clutch plates and the material used for the plates are important factors that can be varied so as to produce the desired amount of lockup for limiting slip.

Whereas during straight-line driving, the limited-slip diff frictionally couples both drive axles to the revolving case, during cornering, the limited-slip allows the outer wheel to rotate at a greater angular velocity than the inner wheel. When turning, the differential pinions rotate about their shaft axis and "walk" (revolve) around the slower inner wheel's side gear. The rotation of the differential pinions releases pressure exerted by the thrust members on the outer clutch plates. As the pressure is released, the outer drive axle and outer wheel are permitted to rotate at a greater angular velocity. In that situation, most of the torque is being supplied to the inner wheel since it remains firmly clutched to the case.

The active clutch pack differential uses hydraulic pressure to clamp the clutch plates together. The hydraulic actuation of the clutch plates can be regulated by the driver or by a microprocessor so that the diff functions either as an open diff or as a "spool" or closed diff. GKN Axles produces an electrically driven active clutch pack diff that collects data from the car's ABS system and uses that data to calculate differential wheel speed. The electric motor, through a ball and ramp mechanism, spreads the ramps to clamp the clutch plates whenever the wheel speed differential is excessive.

Self-locking differentials, such as the famous Detroit Locker™, lock the drive axles together during acceleration in straight-line driving. When the car turns, the self-locking diff senses that the angular velocity of the outer wheel is exceeding that of the inner wheel and reacts by unlocking the diff. Thus, the Detroit Locker™ alternates from locked two-wheel drive to unlocked one-wheel drive when turning.

Torque-sensing differentials allocate the available torque according to the traction available. Whereas limited-slips react to the wheel speed differential, torque-sensing diffs deliver torque to the wheel with greater traction before wheel slippage has begun to occur. The Weisman Locker™, used extensively in racecars in the 1960's and 1970's, has two roller clutches each having an inner race and a plurality of equally spaced cylindrical rollers mounted in a cage. Each inner race is splined to a drive axle. The outer cam is a single unit that revolves with the ring gear and which houses the inner races and rollers. The rollers are caged between the inner races and the outer cam. Each cage is connected to the inner cams by drag springs.

During straight-line driving, the rollers are wedged between the inner races and the outer cam so that rotation of the ring gear (and outer cam) causes the inner races (and drive axles) to rotate. During engine braking, the diff is locked against the coast side ramps of the outer cam, thereby resulting in two-wheel braking. During cornering, the Weismann Locker™ acts like an open diff. When the angular velocity of the outer wheel attempts to exceed that of the inner wheel, the outer drag spring slips on the inner race, liberating the rollers which then slide down the ramps of the outer cam. Thus, all of the driving torque is transferred to the inner axle and the outer axle is free to rotate at a greater angular velocity through the turn. When torque is reapplied (in a straight-line condition), the outer clutch rollers ramp up again and lock the outer wheel in its normally-closed position. The "torque-sensing" ability arises because, as one wheel begins to slip, the rollers are forced up the ramps of the outer cam causing the diff to lock before slippage has begun to occur.

The Torsen™ differential, manufactured by Zexel-Gleason, is a second example of a torque-sensing diff. The Torsen™ uses three pairs of worm gears meshed with a pair of perpendicularly mounted worm gears that are each splined to a drive axle. The principle of operation relies on the fact that worms transmit torque in essentially only one direction. When one wheel begins to rotate excessively more than its counterpart, the worm gears impede the differential rotation, thus redistributing torque according to traction. In other words, a speed differential between the drive wheels is resisted by the worms which produce a great deal of friction when operated transversely (i.e. in the differential action). Thus, the resistance to differential action causes the torque to be transferred from the wheel with lesser traction to the wheel with greater traction. Since this occurs before the onset of wheelspin, this type of diff is also categorized as "torque sensing".

The viscous-coupling differential uses the shear-resistance of highly viscous fluids such as silicone gel to couple two substantially parallel clutch plates. Each of the clutch plates are splined to a drive axle whereby when the angular velocity of one of the drive axles begins to exceed the angular velocity of its counterpart, the viscous shearing resistance increases. As shearing resistance is proportional to the speed differential between the left and right drive axles, the viscous diff has a natural propensity to limit slippage between the drive axles. Protracted use of the viscous diff causes heat buildup which eventually leads to the clutch plates contacting one another. This provides maximum lockup for high-torque driving. Twin viscous couplings can also be used in viscous diffs. A twin viscous coupling employs three parallel clutch plates separating two volumes of viscous fluids. Overspeeding of one of the outer clutch plates (which are splined to the drive axles) is resisted by the shearing action in both volumes of viscous fluid.

Some interesting examples of viscous couplings for transferring torque to drive axles are described in U.S. Pat. Nos. 5,881,849, 5,690,201 and 5,632,185 (Theodor Gassman). In the Gassman device, each drive axle is coupled to a pump which produces an actuating pressure proportional to the rotational speed of the axle. The actuating pressure powers a piston in a cylinder which clamps clutch plates together. The clutch plates are alternately mounted to the drive axles and the case. Turning of the case thus causes synchronous rotation of the drive axles.

In light of the foregoing exposition, it should be apparent that there is a fundamental tradeoff between steering and traction in designing a drive train for a four-wheel drive ATV. With a fully open diff, steering is optimized at the expense of traction (no understeer but risk of wheel slippage) whereas with fully locked drive axles, traction is optimized at the expense of steering (understeer but no wheel slippage). The standard prior art solution to this conundrum is to use a regressive limited-slip differential which is essentially a compromise between an open diff and a closed (or locked) diff. The regressive limited-slip differential limits wheel slip and creates only mild understeer. However, like all compromises, the regressive limited-slip does not provide an ideal solution for either steering or traction. Not only is mild understeer bothersome on an ATV that has no power steering, but the torque transfer capacity plateaus in extreme conditions. Thus, there is a need in the ATV industry for a limited-slip capable of functioning as an open diff under certain conditions and then capable of limiting wheel slip by progressively increasing the amount of torque transferred to the wheel with greater traction.

OBJECTS AND STATEMENT OF THE INVENTION

It is thus an object of the present invention to provide an straddle-type all-terrain vehicle with improved traction.

It is another object of the present invention to provide an straddle-type all-terrain vehicle that has improved traction while minimizing the deleterious effects of understeer.

It is another object of the present invention to provide an straddle-type all-terrain vehicle wherein the amount of torque transferred to the wheel with greater traction increases progressively with the differential wheel speed between the wheel with greater traction and the wheel with lesser traction.

It is another object of the present invention to provide an straddle-type all-terrain vehicle having a limited-slip differential capable of functioning as an open differential under certain conditions and then capable of limiting wheel slip by progressively increasing the amount of torque transferred to the wheel with greater traction.

As embodied and broadly described herein, the invention provides a straddle-type all-terrain vehicle including a chassis and an engine mounted to said chassis; said engine including a crankshaft geared to an output shaft; said output shaft being connected to a drive shaft; said drive shaft being connected to a limited-slip differential; said limited-slip differential, in operation, capable of distributing torque to a left axle coupled to a left wheel and to a right axle coupled to a right wheel; said differential adapted to permit said left and right axles to rotate at different angular velocities and further adapted to limit slip by progressively redistributing torque to the wheel with greater traction when a speed differential between said axles exceeds a predetermined threshold.

The straddle-type all-terrain vehicle of the present invention has a differential that functions initially as an open differential in that it allows the vehicle's left and right axles to rotate at different angular velocities. However, when one of the wheels slips, the speed differential exceeds the threshold, termed the 'cutting point', and the differential then begins to function as a limited-slip differential, limiting slip by transferring torque to the wheel with greater traction in proportion to the wheel speed difference. Whereas prior art ATV differentials are regressive in that their ability to transfer torque decreases as the wheel speed differential increases (eventually reaching a plateau), the progressive limited-slip differential can transfer more and more torque to the wheel with greater traction (does not reach a plateau). It should be noted that while this particular embodiment of an ATV with a progressive differential does not reach a plateau, by reducing the number of clutch plates (from 7 inner plates and 8 outer plates to, say, 5 inner and 6 outer plates) or by varying other attributes of the progressive limited-slip differential, the torque transfer can be made to reach a plateau for a certain wheel speed differential.

Thus, an ATV with a progressive differential provides fundamental advantages over the prior art in steering and traction. Since the progressive limited-slip does not engage until the cutting point, the steering of the ATV (below the cutting point) is unhindered by the effects of understeer (a phenomenon that is particularly detrimental to ATV's since they do not have power steering) and thus require a smaller steering effort from the operator. In conditions of extremely poor traction, when wheel speed differentials become large, an ATV with a progressive differential can transfer relatively more torque to the wheel with greater traction than the prior art regressive limited-slip differential.

Preferably, the front differential comprises a drive pinion meshed with a ring gear, said ring gear being fixed to a differential case, said differential case having a pair of differential pinions meshed to a pair of side gears, said side gears being coupled to said axles, a rotary pump responsive to wheel speed differential, said pump capable of generating a hydraulic pressure in a piston for exerting an axial force on a clutch pack for frictionally coupling said axles, thereby transferring torque from the axle with a higher angular velocity to the axle with a lower angular velocity.

This arrangement ensures that the force exerted on the clutch pack by the piston is directly proportional to the angular velocity of the pump and that the pump's angular velocity is directly related to the wheel speed differential. Thus, the torque transfer is almost directly proportional to wheel speed differential (hence the moniker "progressive" limited-slip differential).

Preferably, the differential case further comprises a cross shaft traversing said differential case and anchored therein for rotation therewith, said differential pinions being rotatably mounted on said cross shaft whereby said differential pinions are able to revolve with the differential case and ring gear and are also able to rotate about the axis of the cross shaft to compensate for the speed differential between said axles.

Below the cutting point, the differential pinions and side gears permit a "differential action" when cornering (i.e. functioning like the standard open differential). When operating slightly above the cutting point, even though the clutch packs are frictionally coupling the two axles together, the coupling force may still be weak enough to permit a partial differential action, meaning that there is some degree of slip between the clutch pack and the side gears, allowing the differential pinions to rotate somewhat.

Preferably, the predetermined threshold of speed differential is less than 10 revolutions per minute and, more preferably, ranges from 1 to 3 revolutions per minute.

The cutting point can be varied to either reduce steering effort or increase traction. By raising the cutting point, the progressive limited-slip differential functions as an open diff for a longer period of time before the clutch pack is frictionally engaged. This favors steering since the wheel speed differential during cornering does not cause the clutch packs to engage. However, when one wheel begins to slip, there is a longer lag until the differential begins to transfer torque to the wheel with greater traction. By lowering the cutting point, the differential is frictionally engaged more readily, even perhaps during sharp cornering (which could lead to understeer). However, at the onset of wheel slip the clutch packs begin to frictionally engage more readily, giving better traction response during slippery conditions.

It should be noted that the cutting point is specific to the vehicle. It is calibrated so as to provide a compromise between steering effort and traction. The calibration of the cutting point is a function of vehicle dynamics (e.g. steering geometry, wheelbase, wheeltrack, weight distribution, etc.). Thus, it should be appreciated that a cutting point will vary from vehicle to vehicle.

Preferably, when the speed differential is less than the threshold, there is a small, constant torque transfer between the axles resulting from pre-load in the limited-slip differential.

A small measure of frictional coupling is desirable for situations when the wheels are both spinning simultaneously. This is achieved by means of a small spring (or equivalent) that exerts a minimal axial load against the clutch packs.

Preferably, the ATV also has a rear output shaft geared to said crankshaft, a rear drive shaft connected to said rear output shaft, a rear differential connected to said rear drive shaft, said rear differential having a drive pinion and ring gear for distributing torque to rear axles, whereby said straddle-type all-terrain vehicle operates as a four-wheel drive.

Although the cornering dynamics of an ATV are such that a rear closed differential is adequate for light rear loads, it becomes necessary for heavy rear loads to employ a rear limited-slip differential (preferably a progressive diff) to provide optimal steering and traction.

Other objects and features of the invention will become apparent by reference to the following description and the drawings.

BRIEF DESCRIPTION OF THE DRAWINGS

A detailed description of the preferred embodiments of the present invention is provided hereinbelow, by way of example only, with reference to the accompanying drawings, in which:

FIG. 5 is an exploded view of the front differential of FIG. 4;

FIG. 6 is a sectional view of a Visco-Lok™ differential used in the front drive train of FIG. 3 mounted to the front drive shaft and to the left and right front axles;

Figure 1:
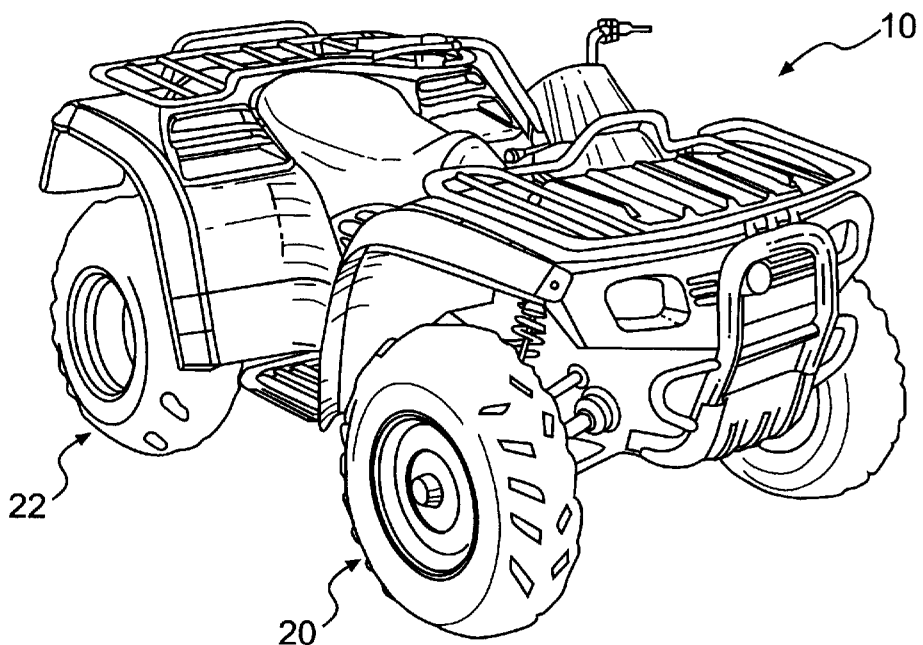
FIG. 1 is a front perspective view illustrating an straddle-type all-terrain vehicle in accordance with the present invention.

In the drawings, preferred embodiments of the invention are illustrated by way of examples. It is to be expressly understood that the description and drawings are only for the purpose of illustration and are an aid for understanding. They are not intended to be a definition of the limits of the invention.

DESCRIPTION OF THE PREFERRED EMBODIMENT

Figure 2:
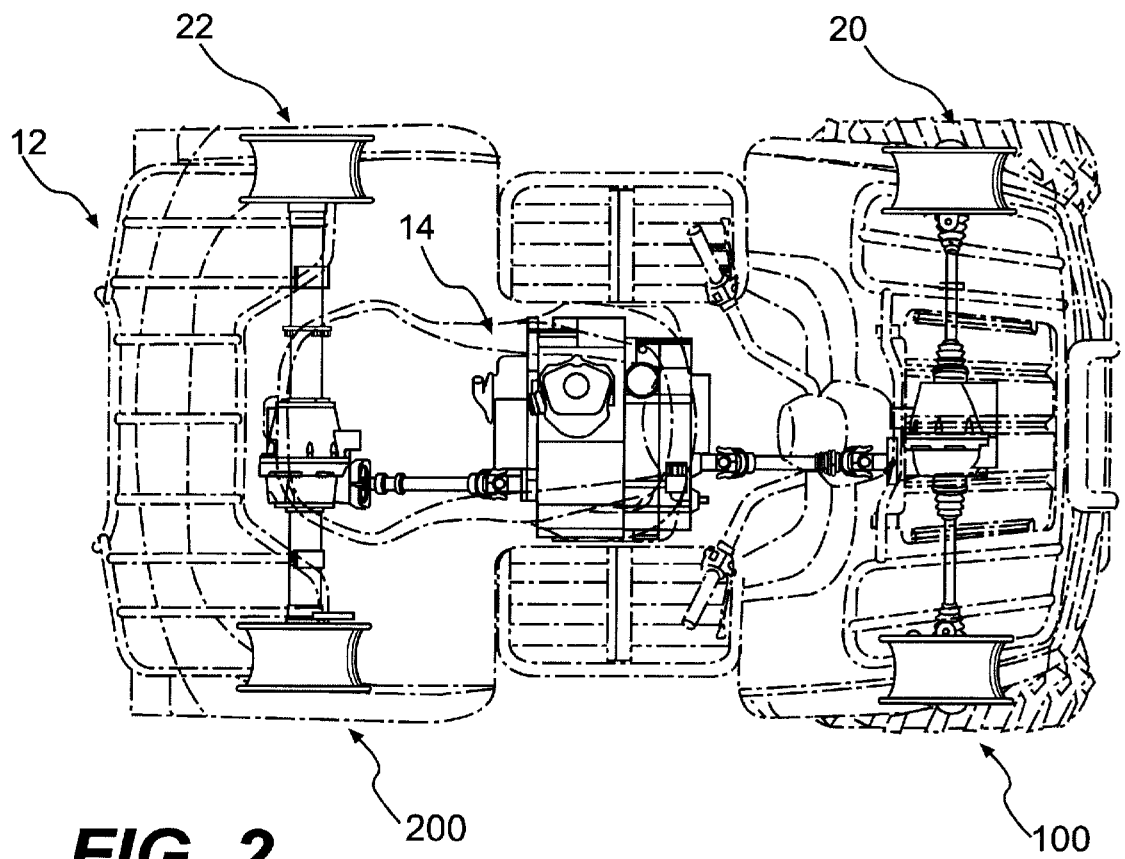
FIG. 2 is a top plan view of the straddle-type all-terrain vehicle of FIG. 1 with the drive train showing in solid lines and the remainder of the vehicle showing in stippled lines.

A four-wheel drive straddle-type all-terrain vehicle (ATV), designated comprehensively by the numeral 10, is illustrated in FIGS. 1 and 2. The ATV 10 has a chassis 12 and an internal combustion engine 14 mounted to the chassis. The engine 14 is a four-stroke, single cylinder Rotax engine.

Figure 3:
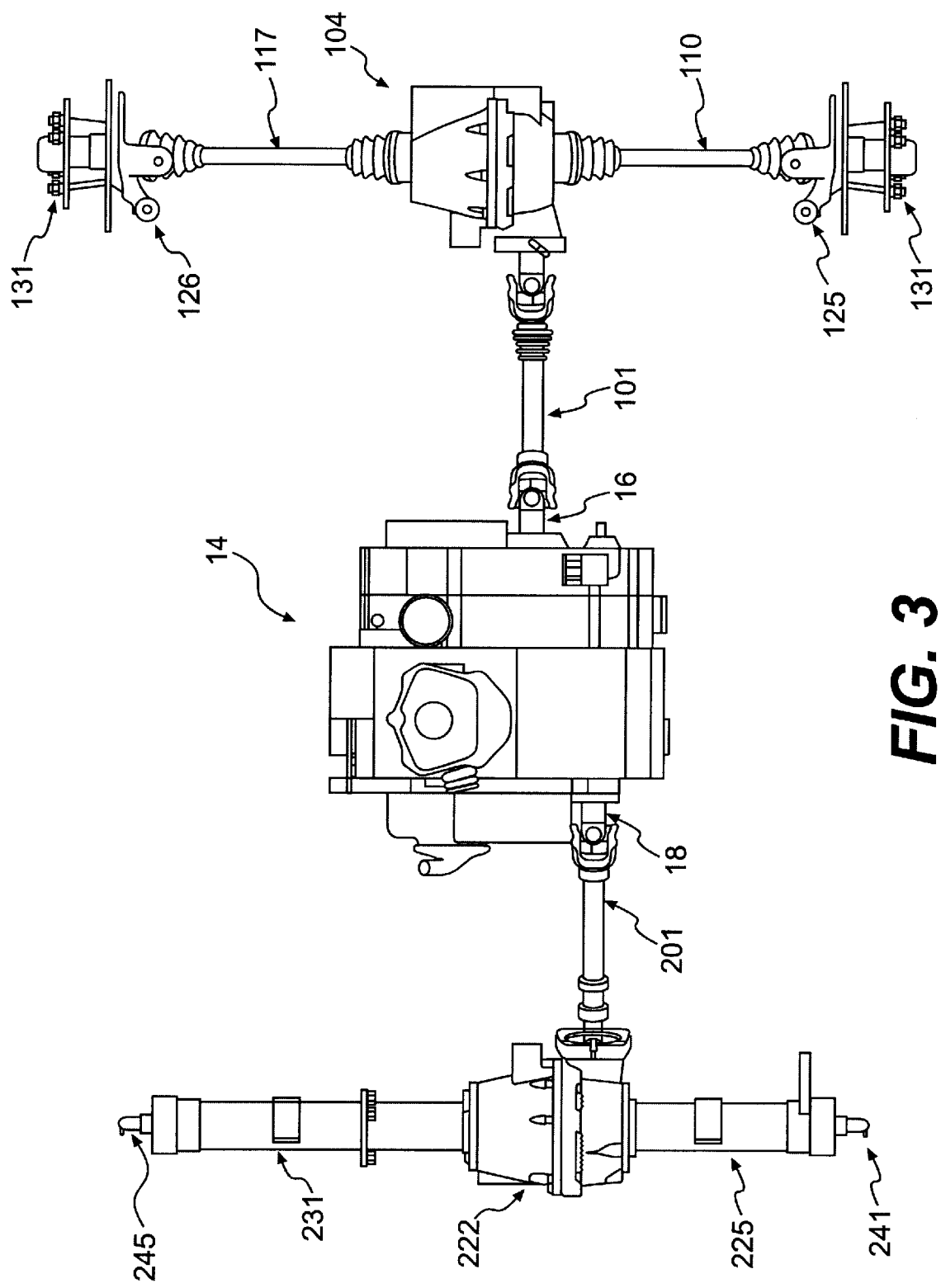
FIG. 3 is a top plan view of the straddle-type all-terrain vehicle drive train of FIG. 2.

As shown in FIG. 3, the engine 14 has both a front output shaft 16 and a rear output shaft 18. The front and rear output shafts are not integral with each other. The front and rear output shafts rotate dependently of each other because the front output shaft is geared to the rear output shaft and the rear output shaft is geared to the crankshaft via a plurality of reduction gears that constitute a transmission.

As depicted in FIGS. 2 and 3, the front output shaft 16 and the rear output shaft 18 are parallel to one another and parallel to the direction of the travel but are not in the same longitudinal vertical plane. The front output shaft 16 is connected to a front drive train 100. Similarly, the rear output shaft 18 is connected to a rear drive train 200. Engine torque (or crankshaft torque) is augmented by the transmissions and delivered to the front and rear output shafts. The front drive train 100 augments and transmits the torque from the front output shaft to a pair of front wheels 20. Similarly, the rear drive train 200 augments and transmits the torque from the rear output shaft to a pair of rear wheels 22.

As illustrated in FIG. 3, the front drive train 100 has a front drive shaft 101 connected via a universal joint to the front output shaft 16. A second universal joint couples the front end of the front drive shaft 101 to the front differential assembly 104. The front differential assembly 104 transmits torque from the front drive shaft to the front left axle 117 and the front right axle 110 which are connected, respectively, to the front wheel hubs 131 for delivering torque to the front wheels.

Figure 4:
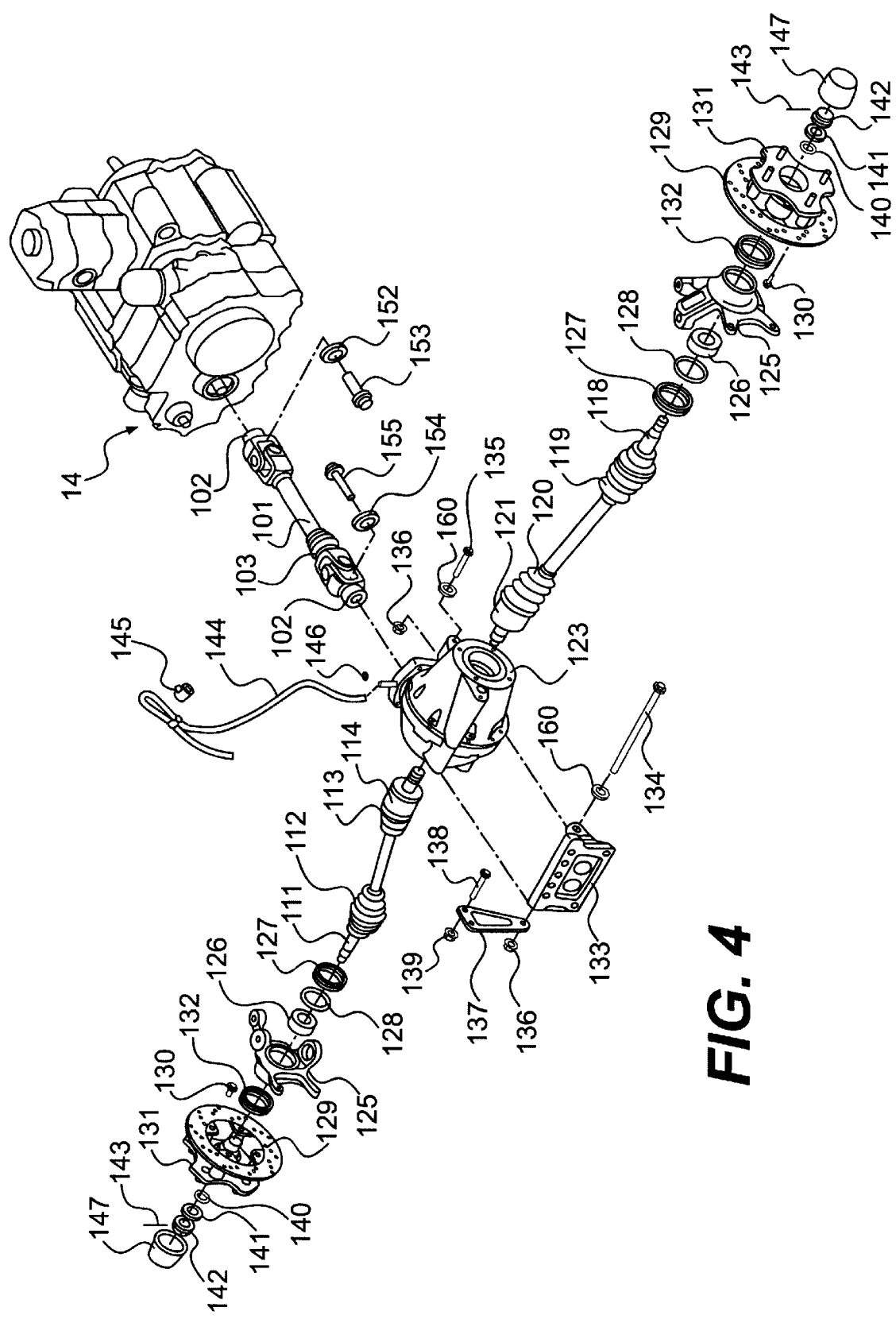
FIG. 4 is an exploded view of the front drive train and engine of FIG. 3.

Referring to the exploded view of FIG. 4, the front drive shaft 101 has universal joints on both of its ends which are connected to the front output shaft 16 on the rearward side (by a washer 152 and a screw 153) and to the front differential assembly 104 on the forward side (by a washer 154 and a screw 155). The universal joints have wear rings 102 and a protector 103 to ensure their longevity and smoothness of operation.

Referring to FIG. 5, the front differential assembly 104 has an outer case composed of two halves. The right half 104a has an oil seal 105 mounted an a rearwardly facing portion. The left half 104b joins with the right half to encase a differential 106. Seals 107 and 159 are located on both the left and right faces of the differential assembly 104. A filler plug 108 and a drain plug 109 are located on the right half 104a for adding and removing lubricant.

As depicted in FIG. 4, a vent hose 144 is mounted on the top side of the differential assembly 104 and retained there by virtue of a clip 145 and spring clamp 146. This vent hose is used to dissipate pressure that arises when the differential heats up. The differential assembly is mounted to the chassis via brackets 133, 137 as well as screws 134, 135, 138 and nuts 136, 139.

As shown in FIG. 3, the front differential assembly 104 is connected to a right front axle 110 and a left front axle 117. The right and left front axles both comprise constant-velocity (CV) joints which provide smoother torque transmission to the front wheels than would a simple universal joint because the universal joint undergoes cyclic acceleration and deceleration as a function of its angle of rotation which provides a generally sinusoidal torque output at the drive wheels.

The right front axle 110 has a constant-velocity (CV) joint 111 at its outer end. The CV joint is shrouded in a dust boot 112. The constant velocity joint is covered with a dust boot to prevent dust, dirt and grime from interfering with the lubricant in the universal joint. Protecting the universal joint with a dust boot thus promotes smooth operation and longevity. The right front axle also has a plunging joint 114 at its inner end which is also shrouded in a dust boot 113. The CV joint is fixed (e.g. splined) to a front hub 131, the hub being fastened by screws 130 to a perforated brake disc 129. The connection of the CV joint to the wheel hub is capped by an O-ring 140, a washer 141, a castellated nut 142, a cotter pin 143, and a wheel cap 147. Concentric with the CV joint 111 is a steering knuckle 125 to which a steering linkage (not shown) is attached. The steering knuckle 125 is non-rotatably mounted on the CV joint 111 between the brake disc 129 and the dust boot 112. The CV joint 111 is allowed to rotate inside the steering knuckle 125 by virtue of an angle bearing 126 which is housed within the steering knuckle. The inner bore of the angle bearing 126 mates with the CV joint's outer shaft portion, allowing the CV joint to rotate within the steering knuckle since the steering knuckle can rotate only about an inclined axis. The angle bearing 126 is held in place by a circlip 128 and by seals 127, 132.

The left front axle 117 has a constant-velocity (CV) joint 118 at its outer end. The CV joint is shrouded in a dust boot 119. The left front axle also has a plunging joint 121 at its inner end which is also shrouded in a dust boot 120. The CV joint is fixed (e.g. splined) to a front hub 131, the hub being fastened by screws 130 to a perforated brake disc 129. The connection of the CV joint to the wheel hub is capped by an 0-ring 140, a washer 141, a castellated nut 142, a cotter pin 143, and a wheel cap 147. Concentric with the CV joint 118 is a steering knuckle 125 to which a steering linkage (not shown) is attached. The steering knuckle 125 is non-rotatably mounted on the CV joint 118 between the brake disc 129 and the dust boot 119. The CV joint 118 is allowed to rotate inside the steering knuckle 125 by virtue of an angle bearing 126 which is housed within the steering knuckle. The inner bore of the angle bearing 126 mates with the CV joint's outer shaft portion, allowing the CV joint to rotate within the steering knuckle since the steering knuckle can rotate only about an inclined axis. The angle bearing 126 is held in place by a circlip 128 and by seals 127, 132.

Figure 7:
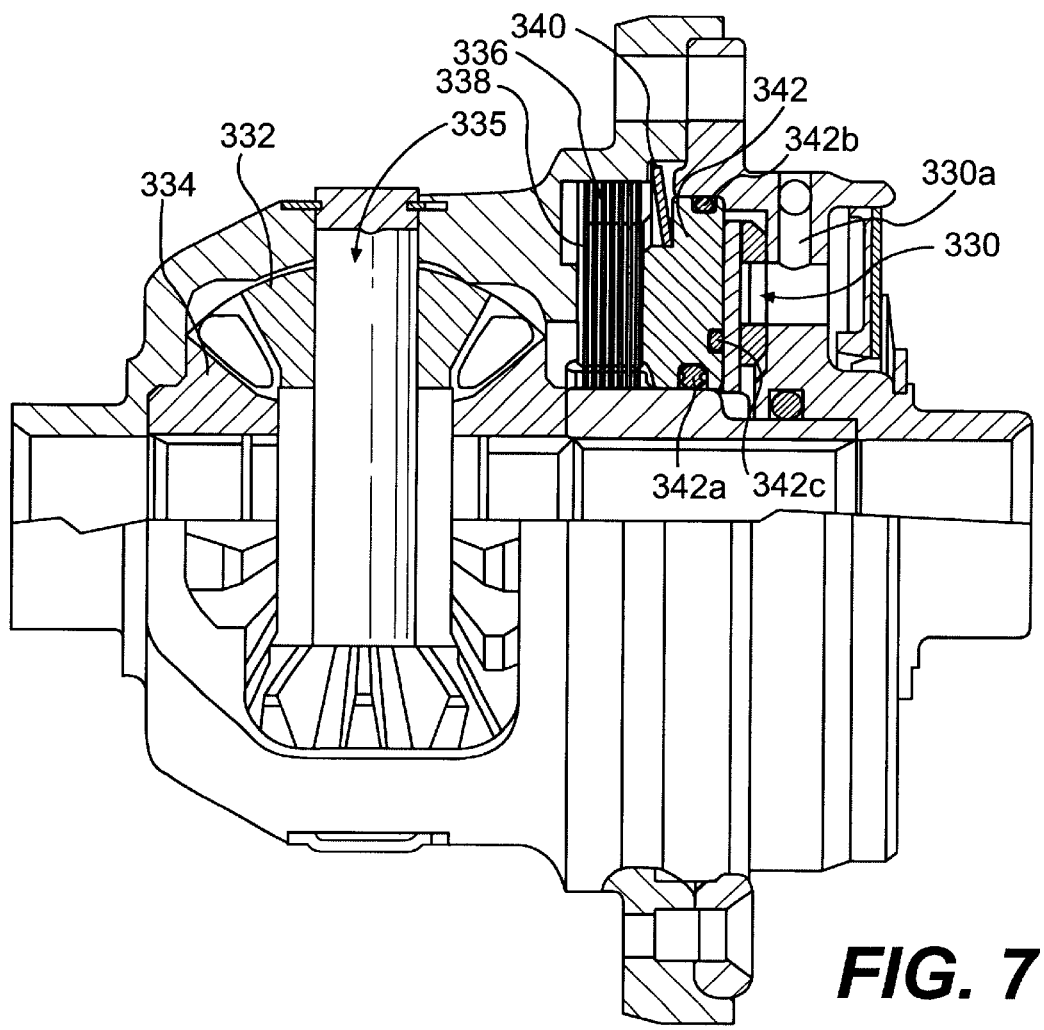
FIG. 7 is a cutaway view of the Visco-Lok™ differential of FIG. 6.
Figure 8:
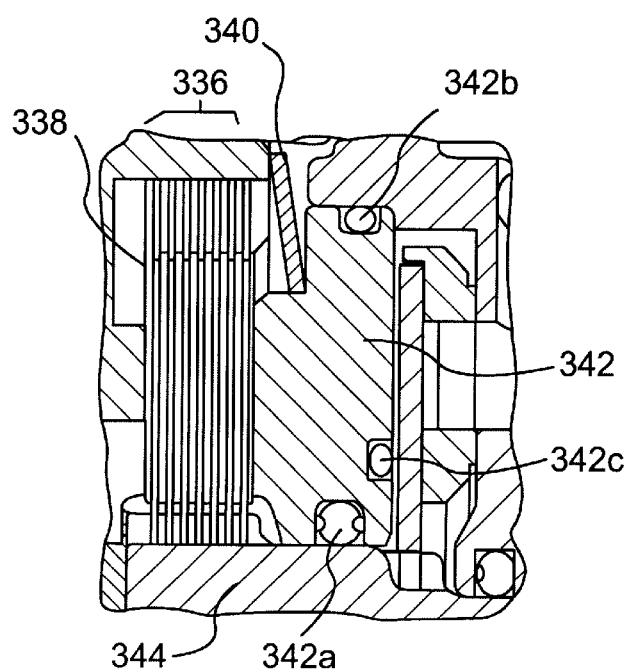
FIG. 8 is a close-up view of the piston and clutch pack of the Visco-Lok™ differential of FIG. 7.

The front differential assembly 104 encases a differential unit 106 that is illustrated in FIGS. 6, 7 and 8. The differential unit 106 is a Visco-Lok™ progressive differential produced for the Bombardier Traxter 1999 by GKN/ADD (Automotive Driveline Division). As shown in FIG. 6, the front drive shaft 101 is fastened to a drive pinion 305. The drive pinion 305 meshes with a ring gear 311. The ring gear 311 is fixed to the differential unit (or case)106. A cross shaft 335 (or pinion shaft) is mounted transversely through the case so that the ring gear, differential case and cross shaft revolve simultaneously about the axis defined by the left and right axles. Rotatably mounted to the cross shaft 335 are a pair of differential pinions 332. The differential pinions are bevel gears. The differential pinions are meshed with a pair of side gears 334 which are also beveled. The left side gear is splined to the left axle 117. Similarly, the right side gear is splined to the right axle 110. The left axle 117 and the right axle 110 rotate within ball bearings 316. The differential pinions 332 and side gears 334 are located on the left side of the front differential assembly. On the right side of the front differential assembly is a pump 330 which is rotatably mounted within the differential case 106. The pump 330 is concentric with the right axle 110. The pump 330 actuates a clutch pack 336 which is also concentric with the right axle 110.

As illustrated in FIG. 7, the pump 330-produces a hydraulic pressure which acts upon an adjacent piston 342. The greater the difference in angular velocity between the right and left axles, the greater is the pressure generated by the pump. The piston exerts a force on a clutch pack 336 equal to the product of the hydraulic pressure and the area of the piston in contact with the hydraulic fluid. A spring 340 provides a pre-load between the piston 342 and the differential case 106. This pre-load ensures a small constant torque transfer between the axles when wheel speed differential is minimal.

The pump 330 defines a closed fluid system that is isolated from fluid communication from the remaining portions of the engine and the differential, e.g., the fluid that lubricates differential pinions 332 and side gears 334. The piston 342 includes first, second and third seals 342a, 342b and 342c that help to isolate fluid from the pump 330. The pump 330 includes an opening 330a that can be used to supply working fluid to the pump 330. One example of a fluid that can be used in the pump is silicone gel because of its high viscosity.

As illustrated in FIG. 8, the clutch pack 336 comprises a series of parallel clutch plates 338. The clutch plates 338 are alternately fixed to either the differential case 106 or a hub 344 which is concentrically fitted to the right axle. When the piston exerts its axial load on the clutch pack 336, the differential locks. The ring gear and differential case thus become locked to the right axle. Since the cross shaft and differential pinions revolve with the case, and since the right side gear is being forced to rotate at the same angular velocity, the left side gear must therefore rotate in synchrony with the right side gear. Thus, the right and left axles are locked, providing optimal traction.

In operation, the drive pinion mounted at the forward tip of the front drive shaft engages a ring gear. The ring gear is mounted to the inner differential case so that when the ring gear is turned, the differential case revolves about the axis defined by the front axles. As the differential case revolves, the differential pinions revolve as well. (In the jargon of the trade, it is said that the pinions "walk around" the side gears). As the differential pinions revolve around the side gears, the gear sides are forced to rotate in an opposite direction. The side gears are splined (or otherwise fixed) to the left and right front axles whereby any rotation of the side gears causes the wheels to rotate therewith. In this manner, the Visco-Lok™ operates like a standard open differential.

However, when the speed differential between the left and right front wheels exceeds a predetermined threshold (called the 'cutting point'), the Visco-Lok™ transmutes from an open diff to a progressive limited-slip differential. The 'cutting point' has a value of 1–3 RPM. At the cutting point, the wheel speed differential causes the pump to build up a pressure to drive the piston against the clutch plates which then limits the wheel slip by transferring torque to the wheel that has greater traction (the wheel that is spinning less). The torque transfer (as measured across the clutch pack, ΔT) as a function of wheel speed differential (ΔRPM) is illustrated graphically in FIG. 11. At the cutting point 410, any further increase in wheel speed differential results in a linearly proportional increase in torque transfer, producing a progressive differential response 440.

Below the cutting point, the torque variation across the clutch pack may be zero or a small constant value. Sometimes, the clutch pack is pre-loaded by a spring, in which case the torque variation across the clutch pack (for a wheel speed differential less than the cutting point) can be a small constant value 400.

The Visco-Lok™ initially functions practically like an open diff, allowing optimal steering unencumbered by the limited-slip coupling. When the wheel speed differential exceeds the cutting point, the diff engages, progressively transferring torque to the wheel with greater traction as a function of the wheel speed differential. As the wheel speed differential increases, the transfer of torque increases in a virtually linear fashion. Unlike the regressive differential, there is no plateau of torque transfer. Thus, in extreme conditions, the amount of torque transferred will be much larger than what could be transferred under similar circumstances by a regressive-type limited-slip.

Figure 11:
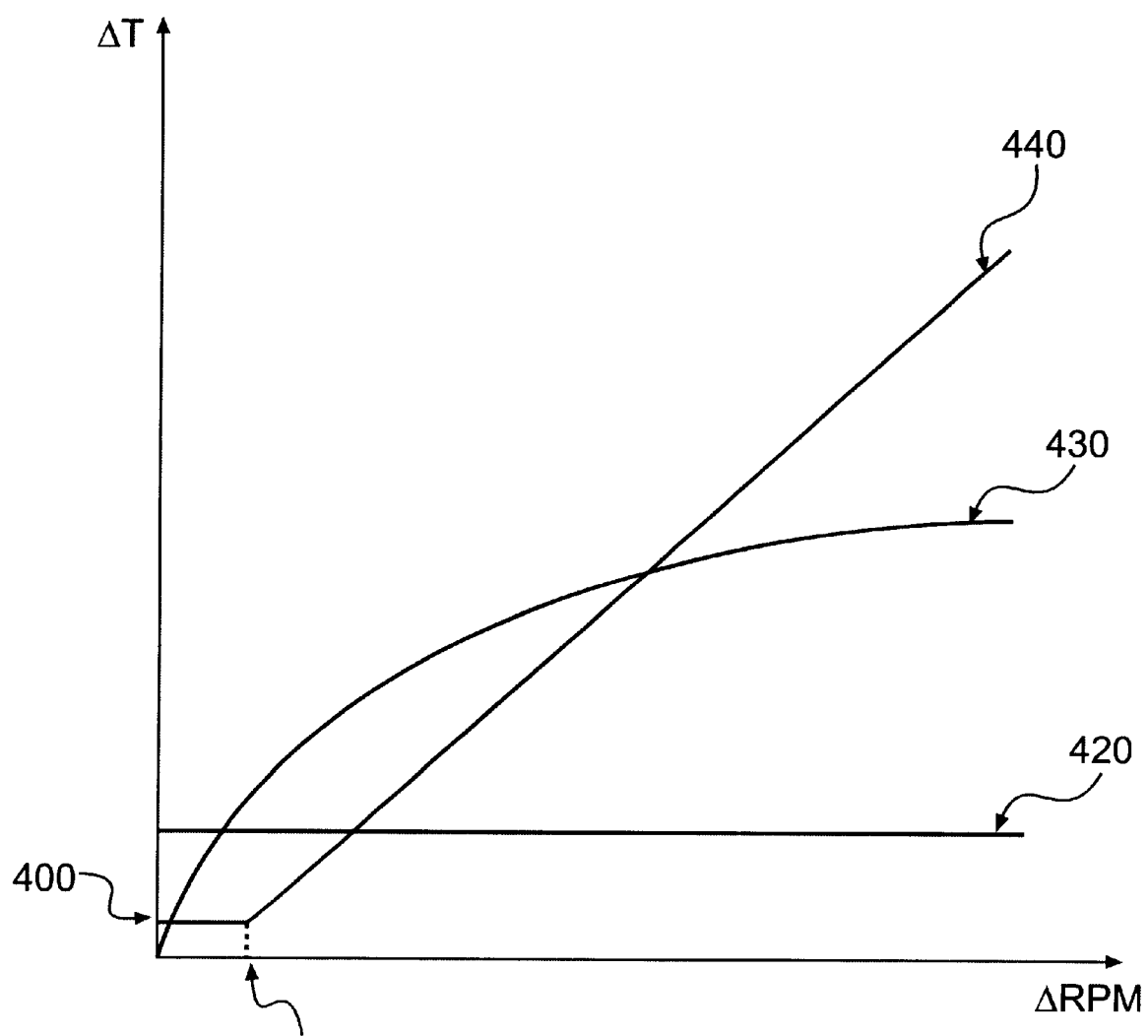
FIG. 11 is a graph of the variation in torque transfer across the clutch pack as a function of the wheel speed differential.

As depicted in the graph of FIG. 11, the progressive differential is superior to the regressive differential and the over-running clutch that exist in the prior art ATV's. The overrunning clutch can transfer a constant amount of torque across the clutch packs (i.e. to the wheel with greater traction) regardless of the differential in wheel speed between the right and left wheels (as evinced by the over-running response 420). Thus, in extremely slippery conditions, the wheels are susceptible to spinning wildly because the over-running clutch cannot transfer more or less than the predetermined constant amount of torque. The regressive differential will initially transfer more and more torque to the wheel with greater traction as the wheel speed differential increases. However, the torque transfer capability of the regressive differential plateaus at a certain point beyond which any further increase in wheel speed differential will have no effect on the torque transfer (regressive curve 430). In extreme conditions, a substantial wheel speed differential will not produce enough torque transfer to dislodge the vehicle. Not only is torque transfer of the regressive differential bounded by the plateau phenomenon but the regressive differential presents a greater resistance to steering because its limited-slip function is engaged even at low wheel speed differentials (unlike the progressive diff). Thus, the regressive differential causes understeer which is noticeable on an ATV because of the lack of power steering. In contrast, the Visco-Lok™ progressive differential, when operating above the cutting point, transfers torque in proportion to the wheel spin differential. This means that the more one wheel spins with respect to the other, the more torque will be transferred to the wheel with greater traction (i.e. to the non-slipping wheel). With the progressive diff, there is no plateau. In effect, the transfer of torque to the non-slipping wheel as a function of the wheel speed differential increases without a theoretical limit. In practice, the differential wheel speed, for a constant tractive coefficient of friction, will diminish as torque is transferred from the spinning wheel to the wheel with traction. The Visco-Lok™ can be thought of as a negative feedback system, transferring torque away from the slipping wheel in proportion to the speed differential between the slipping wheel and the non-slipping wheel, thereby reducing the over-speeding of the slipping wheel.

In effect, the Visco-Lok™ progressive differential is a "no-compromise" solution to the fundamental steering-traction tradeoff that has traditionally challenged ATV designers. Below the cutting point, the progressive diff functions as an open diff. The wheel speed differential produced by steering the ATV is not enough to overcome the cutting point threshold. Thus, without the effects of understeer caused by limited-slips that are engaged all the time, steering is rendered easy. When one wheel slips and the speed differential between the wheels exceeds the cutting point, the pump drives the pistons to clamp the clutch packs, causing the progressive limited-slip differential to lock the drive axles with greater and greater force so as to transfer available torque to the wheel which is slipping the least.

As illustrated in FIG. 3, the rear drive train 200 has a rear drive shaft 201 connected via a universal joint to the rear output shaft 18. The rear drive shaft 201 is freely rotatable within a fixed rear sleeve (immobile with respect to the chassis). The rear drive shaft 201 drives the rear differential 222. The rear differential 222 is said to be permanently closed or locked. (In that regard, it should be noted that a "permanently locked differential" is an oxymoron since the term "differential", strictly speaking, implies that the left and right axles are capable of turning at different speeds. In a permanently locked differential, the left and right axles are fixed together and are thus driven at the same angular velocity. Nevertheless, since the term "permanently locked differential" is a misnomer that is accepted throughout the industry, it will thus be used in similar manner throughout this specification to mean an integral rear axle incapable of differential action.)

Since the rear differential 222 is permanently closed, it has only two bevel gears. At the rearward end of the rear drive shaft 201 is a drive pinion which is beveled so as to mesh with a perpendicular, beveled ring gear. The ring gear is fixed to a rear axle so that rotation of the ring gear due to the drive pinion causes the rear axle to rotate within a right tube 225 and a left tube 231. At the end of the rear axle is a right wheel hub 241 and a left wheel hub 245 to which the rear wheels 22 are fastened. Thus, the rotation of the drive pinion is converted to the perpendicular rotation of the rear axle. Due to the 3.6:1 gear ratio between the drive pinion and ring gear, there is also a further reduction in speed and a commensurate increase in torque between the rear drive shaft and the rear axle.

Figure 9:
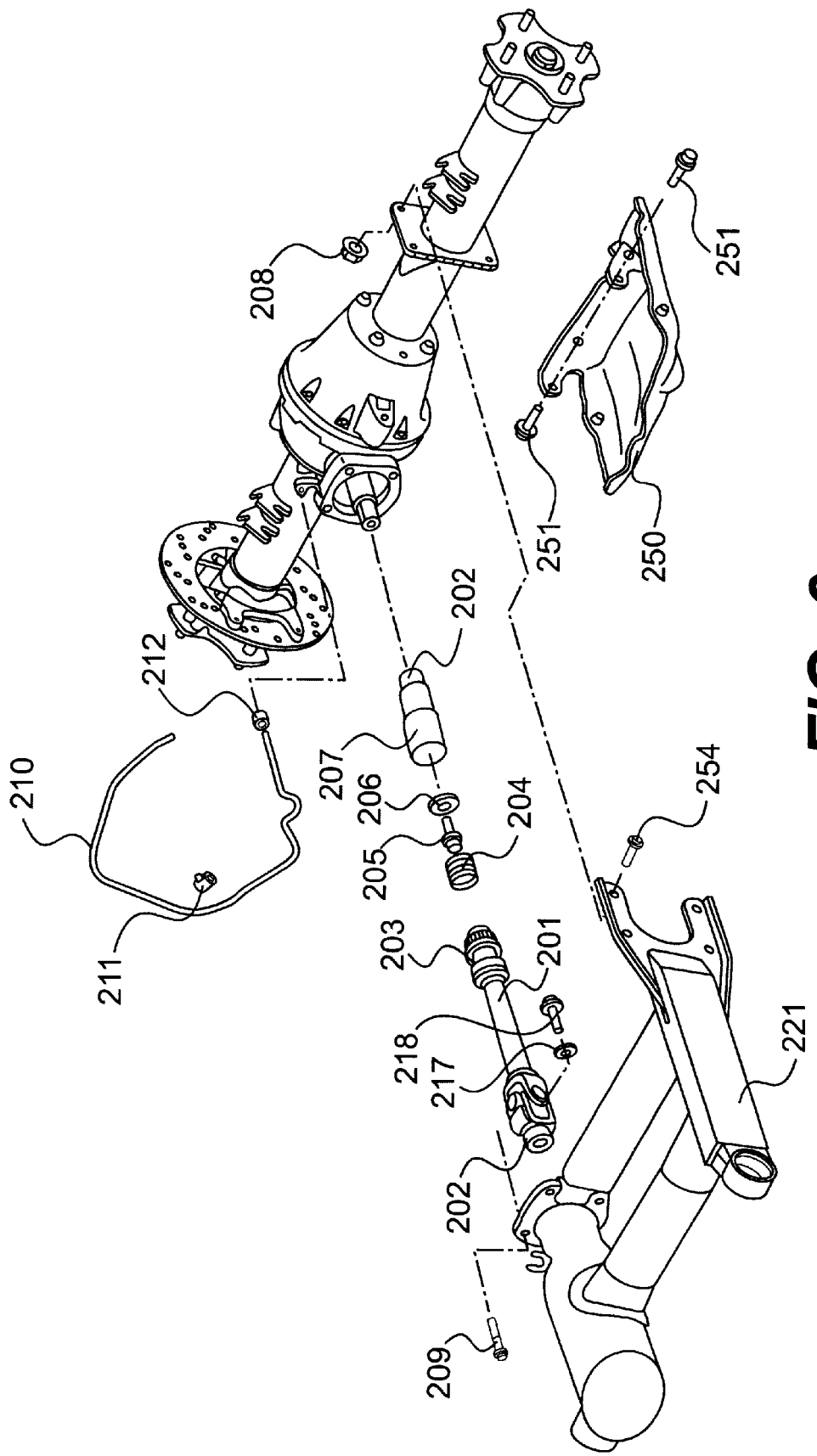
FIG. 9 is an exploded view of the rear drive train shown in FIG. 3.
Figure 10:
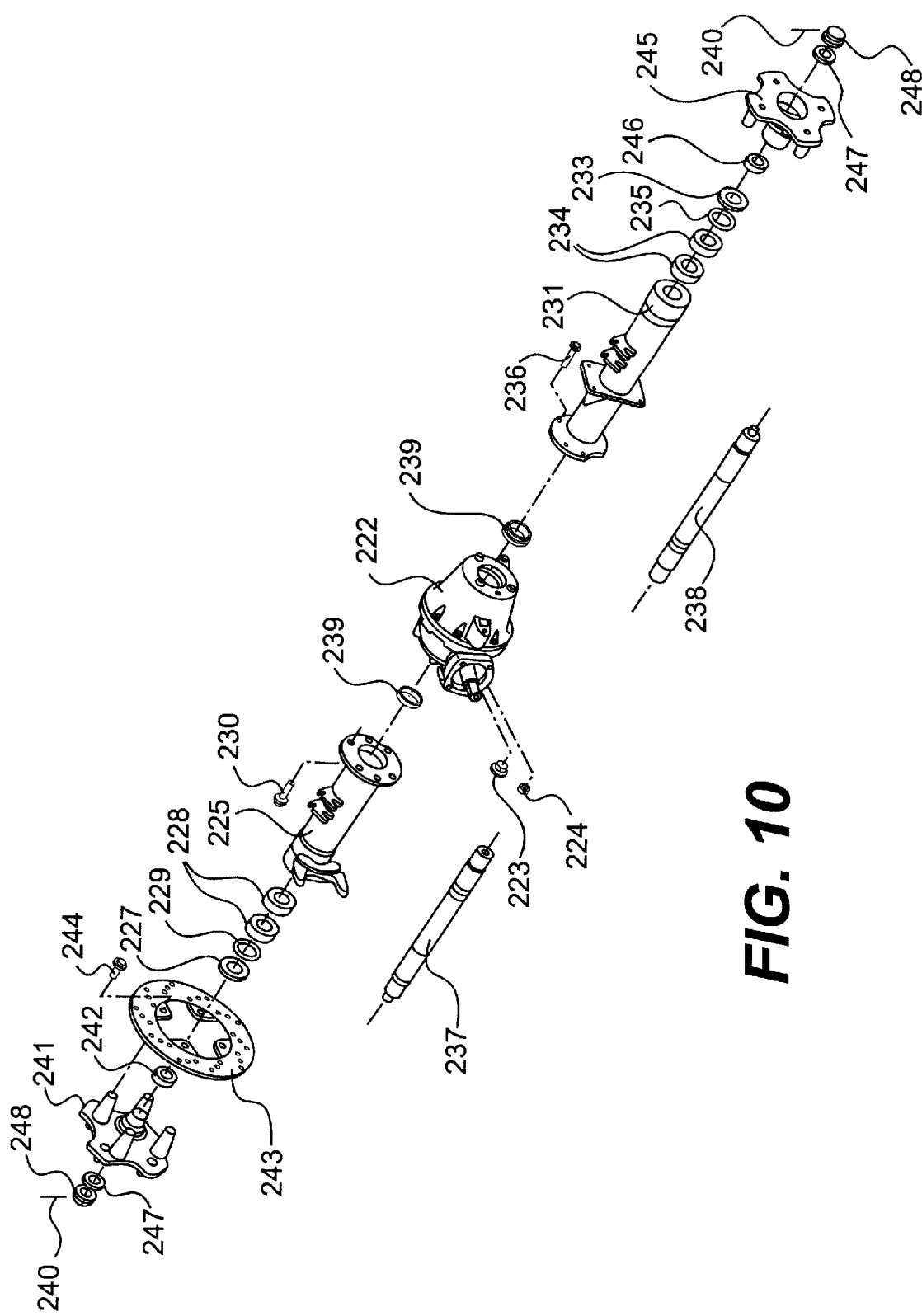
FIG. 10 is a further exploded view of the rear drive train of FIG. 9.

FIGS. 9 and 10 are exploded views showing additional details of the assembly of the rear drive train 200. The rear drive shaft 201 has a wear ring 202 for connection with the rear output shaft 18. The rear drive shaft 201 has a sealing ring 203 for connection to a coupler 207 which also has a wear ring 202 for connection to the drive pinion of the rear differential 222. The coupler is fastened to differential 222 by a Scotch Grip™ retainer screw 205 and washer 206. A lock spring 204 is located between the coupler and the sealing ring.

The rear drive shaft 201 is housed in a swing arm housing 221 which is fastened by four flanged elastic M10 nuts 208 and four flanged hexagonal M10×25 screws 254 to a squarish flange on the left tube 231. Four M10×25 socket screws 209 also fasten the swing arm housing 221 to the differential 222 by threading into forward-facing tapped bores in the rear differential's outer case. A vent hose 210 is connected with a clip 211 and spring clamp 212 to the differential 222 to reduce air pressure arising from heating of the differential 222. The differential 222 has a filler plug 223 and a drain plug 224 for adding and removing lubricant.

A washer 217 and a Scotch Grip™ M8 screw 218 are used to fasten the rear drive shaft to the rear output shaft.

Inside the differential 222 and connected to the ring gear is a right axle 237 and a left axle 238. (These are sometimes referred to as halfshafts.) Both the right and left axles are splined at both ends to ensure non-slip torque transmission between the ring gear and the wheels. Although the left and right axles are separate, they are fixed together inside the differential 222 so that they rotate in synchrony. The left and right axles rotate freely inside the left tube 231 and the right tube 225, respectively. Both the right and left tubes have circular flanges at their inner ends which are fastened to the outer case of the differential 222 by four screws on each side. Seals 239 are mounted concentric with the axles 237,238 in a counterbored recess on either side of the outer case of the differential 222.

Inside the right tube 225, the right axle 237 is mounted on ball bearings 228. An oil seal 227 and a retaining ring 229 keep the bearings and lubricant inside the tube. A perforated brake disc 243 is fastened by four M8 Scotch Grip™ socket screws 244 to four peripheral protrusions on the right wheel hub 241. The right wheel hub also has a central protrusion on which is mounted a wear ring 242. The right wheel hub, brake disc and wear ring are all mounted on the right axle 237. The splined end of the right shaft 237 engages a bore in the central protrusion of the right wheel hub. The right axle is then capped with a washer 247, a castellated nut 248 and a cotter pin 240.

Inside the left tube 231, the right axle 238 is mounted on ball bearings 234. An oil seal 233 and a retaining ring 235 keep the bearings and lubricant inside the tube. (There is no brake disc on the left side because the differential 222 is permanently closed and thus braking the fixed rear axle on the right side only will cause both the left and right wheels to brake. Nevertheless, the left wheel hub 245 is identical to the right wheel hub 241, having four peripheral protrusions and a central protrusion. The symmetry of left and right hubs simplifies manufacture and also allows for the future possibility of using an open or limited-slip differential on the rear which would necessitate brake discs on both left and right wheels.) The left wheel hub 245 has a central protrusion on which is mounted a wear ring 246. The left wheel hub and wear ring are mounted on the left axle 238. The splined end of the left shaft 238 engages a bore in the central protrusion of the left wheel hub. The left axle is then capped with a washer 247, a castellated nut 248 and a cotter pin 240.

The rear differential 222 also has an underside protector 250 which is connected to the right tube 225 and left tube 231 by a pair of flanged hexagonal M8×10 Scotch Grip™ screws 251. This protector is especially important for an ATV when traversing extremely rough terrain.

The above description of preferred embodiments should not be interpreted in a limiting manner since other variations, modifications and refinements are possible within the spirit and scope of the present invention. The scope of the invention is defined in the appended claims and their equivalents.

What is claimed is:

1. An all-terrain vehicle including a straddle seat, a chassis and an engine mounted to said chassis; said engine including a crankshaft geared to an output shaft; said output shaft being connected to a drive shaft; said drive shaft being associated with a limited-slip differential system having a differential that is connected to the drive shaft and distributes torque to a left axle coupled to a left wheel and to a right axle coupled to a right wheel in accordance with a speed differential between the right and left axles that is sensed by the limited-slip differential system; said left and right axles being substantially aligned with one another and coupled to the differential, wherein said differential permits said left and right axles to rotate at different angular velocities when the speed differential is below a predetermined threshold, and wherein said differential limits slip by progressively redistributing torque to the one of the left and right wheels with greater traction when the speed differential between said left and right axles, as sensed by the limited-slip differential system, exceeds the predetermined threshold; said differential further including a differential case and a rotary pump coupled between one of said left and right axles and said differential case and being responsive to the speed differential between the left and right axles; said pump defining a closed fluid system and being capable of generating a hydraulic pressure on a piston for exerting an axial force on a clutch pack including a first plurality of clutch plates non-rotatably coupled to said differential case and a second plurality of clutch plates non-rotatably coupled through a hub member to said one of left and right axles, said first and second pluralities of clutch plates being alternately arranged with respect to one another and being frictionally engaged with one another by said piston for frictionally coupling said left and right axles, thereby redistributing torque from one of the left a right axles with a higher angular velocity to another of the left and right axles with a lower angular velocity, wherein said hub member comprises first and second stepped portions, said first stepped portion being thicker than said second stepped portion and said fir stepped portion being non-rotatably coupled to the second plurality of clutch plates, said second stepped portion being in contact with a portion of the differential case and said piston being slidingly mounted on said first stepped portion.

2. An all-terrain vehicle as defined in claim 1, wherein, in operation, when the speed differential exceeds the predetermined threshold, torque is redistributed from one of the left and right axles with a higher angular velocity to another of the left and right axles with a lower angular velocity in a manner that increases proportionally with the speed differential between said left and right axles.

3. An all-terrain vehicle as defined in claim 2, wherein, in operation, when the speed differential is less than said predetermined threshold, there is no substantial redistribution of torque.

4. An all-terrain vehicle as defined in claim 3, wherein, in operation, when said speed differential is less than the predetermined threshold, said differential functions as an open differential, thereby allowing said left and right axles to rotate independently of each other.

5. An all-terrain vehicle as defined in claim 4, wherein said differential includes a drive pinion meshed with a ring gear; said ring gear being fixed to said differential case; said differential case including a pair of differential pinions meshed to a pair of side gears; said side gears being coupled to said axles.

6. An all-terrain vehicle as defined in claim 5, wherein said differential case further comprises a cross shaft traversing said differential case and anchored therein for rotation therewith; said differential pinions being rotatably mounted on said cross shaft whereby said differential pinions are able to revolve with the differential case and ring gear and are also able to rotate about the axis of the cross shaft to compensate for the speed differential between said left and right axles.

7. An all-terrain vehicle as defined in claim 6, wherein said differential comprises a threshold-setting device whereby said predetermined threshold can be selected to provide a desired compromise between steering and traction.

8. An all-terrain vehicle as defined in claim 7 wherein, when said piston is actuated by said pump, said threshold-setting device resists advancement of said piston, thereby delaying said clutch pack from becoming frictionally coupled.

9. An all-terrain vehicle as defined in claim 8 wherein said threshold-setting device is located between said piston and a portion of said differential case.

10. An all-terrain vehicle as defined in claim 9 wherein said threshold-setting device is a spring member.

11. An all-terrain vehicle as defined in claim 10 wherein said predetermined threshold is less than 10 revolutions per minute.

12. An all-terrain vehicle as defined in claim 11 wherein said predetermined threshold of speed differential ranges from 1 to 3 revolutions per minute.

13. An all-terrain vehicle as defined in any one of the preceding claims, wherein said engine is geared to a front output shaft; said front output shaft being connected to a front drive shaft; said front drive shaft being connected to said differential.

14. An all-terrain vehicle as defined in claim 13, wherein said engine is also geared to a rear output shaft; said rear output shaft being connected to a rear drive shaft; said rear drive shaft being connected to a second differential.

15. An all-terrain vehicle as defined in any one of the claims 1 to 12, wherein said engine is geared to a rear output shaft; said rear output shaft being connected to a rear drive shaft; said rear drive shaft being connected to said differential.

16. An all-terrain vehicle as defined in claim 1,
wherein a length between a portion of said first plurality of clutch plates connected to the differential case and a portion of said second plurality of clutch plates connected to the hub member is greater man a length of said piston between a portion of said piston in contact with said hub member and a portion of said piston in contact with said differential case.

17. An all-terrain vehicle as defined in claim 1, further comprising a spring that provides a preload applied to the piston.

18. An all-terrain vehicle as defined in claim 17, wherein the preload is applied between the piston and the differential case to which a ring gear is fixed.

19. An all-terrain vehicle as defined in claim 17, wherein the piston has a generally rectangular profile with a cutout formed therein that faces the clutch pack, and wherein the spring has one end seated within the cutout.

20. An all-terrain vehicle as defined in claim 1, further comprising a first seal on a lower surface of the piston, a second seal on an upper surface of the piston, and a third seal between the first and second seals and positioned on a side surface of the piston, wherein the piston is between the clutch pack and the third seal.

21. An all-terrain vehicle as defined in claim 1, wherein the pump has a housing that defines an opening for receiving working fluid.

22. An all-terrain vehicle as defined in claim 1, wherein the piston is slidable relative to said differential case in a coaxial direction with said axles.

23. An all-terrain vehicle including a straddle seat, a chassis and an engine mounted to said chassis; said engine including a crankshaft geared to an output shaft; said output shaft being connected to a drive shaft; said drive shaft being connected to a limited-slip differential; said limited-slip differential, in operation, capable of distributing torque to a left axle coupled to a left wheel and to a right axle coupled to a right wheel of one of a pair of front and rear wheels; said differential adapted to permit said left and right axles to rotate at different angular velocities and further adapted to limit slip by progressively redistributing torque to the wheel with greater traction when a speed differential between said axles exceeds a predetermined threshold, wherein said progressive limited-slip differential comprises a threshold-setting device includes a spring having first and second end portions, the first end portion being arranged in a notched portion of the differential case and the second end portion sitting on a cutout formed in the piston, a length separating the first end portion and the second end portion being larger than a dimension of the cutout formed in the piston whereby said predetermined threshold can be selected to provide a desired compromise between steering and traction; said differential further including a differential case and a rotary pump coupled between one of said left and right axles and said differential case and being responsive to the speed differential between the left and right axles; said pump being capable of generating a hydraulic pressure on a piston for exerting an axial force on a clutch pack including a first plurality of clutch plates non-rotatably coupled to said differential case and a second plurality of clutch plates non-rotatably coupled to said one of left and right axles, said first and second pluralities of clutch plates being alternately arranged with respect to one another and being frictionally engageable with one another by said piston for frictionally coupling said left and right axles, thereby redistributing torque from one of the left and right axles with a higher angular velocity to another of the left and right axles with a lower angular velocity, wherein the pump defines a closed fluid system.

24. An all-terrain vehicle as defined in claim 23,
wherein a length between a portion of said first plurality of clutch plates connected to the differential case and a portion of said second plurality of clutch plates connected to the hub member is greater than a length of said piston between a portion of said piston in contact with said hub member and a portion of said piston in contact with said differential case.

25. An all-terrain vehicle including a straddle seat, a crankshaft geared to a front output shaft; said front output shift being connected to a front drive shaft; said front drive shaft being associated with a limited-slip differential system having a front differential that is connected to the front drive shaft and distributes torque to a left axle coupled to a left wheel and to a right axle coupled to a right wheel of a pair of front wheels in accordance with a speed differential between the left and right axles that is sensed by the limited-slip differential system; wherein said front differential permits said left and right axles to rotate at different angular velocities, wherein said front differential limits slip by progressively redistributing torque to the wheel with greater traction when the speed differential between said left and right axles exceeds a predetermined threshold, and wherein said crankshaft is also geared to a rear output shaft; said rear output shaft being connected to a rear drive shaft; said rear drive shaft being connected to a second limited-slip differential system having a rear differential connected to said rear drive shaft and a left axle coupled to a left wheel and a right axle coupled to a right wheel of a pair of rear wheels, said front and rear differentials each including a differential case and a rotary pump coupled between one of respective left and right axles and said differential case and being responsive to the speed differential between associated left and right axles; said pump defining a closed fluid system and being capable of generating a hydraulic pressure on a piston for exerting an axial force on a clutch pack including a first plurality of clutch plates non-rotatably coupled to said differential case and a second plurality of clutch plates non-rotatably coupled through a hub member o said one of left and right axles, said first and second pluralities of clutch plates being alternately arranged with respect to one another and being frictionally engageable with one another by said piston for frictionally coupling said left and right axles, thereby redistributing torque from one of the left and right axles with a higher angular velocity to another of the left an right axles with a lower angular velocity, wherein said hub member comprises first and second stepped portions, said first stepped portion being thicker than said second stepped portion and said fist stepped portion being non-rotatably coupled to the second plurality of clutch plates, said second stepped portion being in contact with a portion of the differential case and said piston being slidingly mounted on said first stepped portion.

26. An all-terrain vehicle as defined in claim 25,
wherein a length between a portion of said first plurality of clutch plates connected to the differential case and a portion of said second plurality of clutch plates connected to the hub member is greater da a length of said piston between a portion of said piston in contact with said hub member and a portion of said piston in contact with said differential case.

* * * * *